US008898086B2

(12) United States Patent
Downing et al.

(10) Patent No.: US 8,898,086 B2
(45) Date of Patent: Nov. 25, 2014

(54) SYSTEMS AND METHODS FOR TRANSMITTING FINANCIAL ACCOUNT INFORMATION

(75) Inventors: Robert W. Downing, St. Petersburg, FL (US); Nicole Steffensmeier, St. Petersburg, FL (US)

(73) Assignee: Fidelity National Information Services, Jacksonville, FL (US)

( * ) Notice: Subject to any disclaimer, the term of this patent is extended or adjusted under 35 U.S.C. 154(b) by 608 days.

(21) Appl. No.: 12/891,334

(22) Filed: Sep. 27, 2010

(65) Prior Publication Data

US 2012/0078798 A1 Mar. 29, 2012

(51) Int. Cl.
G06Q 20/00 (2012.01)
G06Q 20/40 (2012.01)

(52) U.S. Cl.
CPC ................................ *G06Q 20/401* (2013.01)
USPC ........................................................ 705/64

(58) Field of Classification Search
CPC ................................................... G06Q 20/401
USPC ............................................................ 705/64
See application file for complete search history.

(56) References Cited

U.S. PATENT DOCUMENTS

| | | | |
|---|---|---|---|
| 4,234,932 A | 11/1980 | Gorgens | |
| 4,977,595 A | 12/1990 | Ohta et al. | |
| 5,163,098 A | 11/1992 | Dahbura | |
| 6,236,981 B1 | 5/2001 | Hill | |
| 6,327,578 B1 | 12/2001 | Linehan | |
| 6,853,987 B1 | 2/2005 | Cook | |
| 6,889,325 B1 | 5/2005 | Sipman et al. | |
| 6,895,391 B1 | 5/2005 | Kausik | |
| 7,100,821 B2 | 9/2006 | Rasti | |
| 7,292,999 B2 | 11/2007 | Hobson et al. | |
| 7,376,629 B1 | 5/2008 | McIsaac et al. | |
| 7,415,443 B2 | 8/2008 | Hobson et al. | |
| 7,426,277 B2 | 9/2008 | Kimura | |
| 7,543,738 B1 | 6/2009 | Saunders et al. | |
| 7,577,616 B2 | 8/2009 | Zhu | |
| 2001/0039535 A1 | 11/2001 | Tsiounis et al. | |
| 2002/0013904 A1 | 1/2002 | Gardner | |
| 2002/0049670 A1* | 4/2002 | Moritsu et al. | 705/40 |
| 2004/0059686 A1 | 3/2004 | Levesque | |
| 2004/0103060 A1 | 5/2004 | Foth et al. | |
| 2004/0158532 A1 | 8/2004 | Breck et al. | |
| 2005/0246528 A1 | 11/2005 | Powers | |
| 2005/0256806 A1 | 11/2005 | Tien et al. | |
| 2006/0144925 A1 | 7/2006 | Jones | |
| 2006/0253392 A1 | 11/2006 | Davies | |
| 2009/0099961 A1 | 4/2009 | Ogilvy | |
| 2009/0144203 A1 | 6/2009 | Hurry | |
| 2009/0261162 A1 | 10/2009 | Kargman et al. | |
| 2012/0023009 A1* | 1/2012 | Pazlar et al. | 705/39 |
| 2013/0117138 A1* | 5/2013 | Hazel et al. | 705/16 |

* cited by examiner

*Primary Examiner* — Charles C Agwumezie
(74) *Attorney, Agent, or Firm* — Finnegan, Henderson, Farabow, Garrett & Dunner, LLP

(57) ABSTRACT

Described herein are methods and systems for securely transmitting information, including financial account information. An irreversibly encrypted account number can be transmitted to a processing party as part of a transmission packet. The processing party can extract other information from the transmission packet to determine one or more registered account numbers that may match the irreversibly encrypted account number. Using the same encryption algorithm used to create the transmission packet, the processing party can create a verification packet by encrypting the one or more registered account numbers and determine if the verification packet matches the transmission packet. As a result, financial account information can be transmitted in such a way that it cannot be intercepted and then used to perform an unauthorized transaction.

15 Claims, 12 Drawing Sheets

US 8,898,086 B2

SYSTEMS AND METHODS FOR TRANSMITTING FINANCIAL ACCOUNT INFORMATION

BACKGROUND

When using data networks, e.g. the Internet, for transactions between parties exchanging goods, services, or information, one of the problems observed is the lack of secure and simple transaction methods. The most widely accepted method of protecting information stored in a computer system or communicated over networks involves the use of data encryption. Data encryption technology is basically classified into two technology types: symmetric and asymmetric. Symmetric encryption uses the same key to both encrypt and decrypt an information file. Asymmetric encryption uses two keys which share a relationship such that information encrypted with one key can be decrypted only with the second key.

Encryption algorithms are characterized as being either reversible or irreversible. Symmetric and asymmetric encryption algorithms are reversible. A reversible algorithm is one where data is recoverable from its encrypted state back to its pre-encrypted state. One example of an irreversible algorithm is a hash algorithm. Secure hash algorithms were originally used to detect alterations to an information file, whether intentional or unintentional. It is not surprising, therefore, that the output of the algorithm is called a message integrity code (MIC) or message digest (MD). Another characteristic of hash algorithms is that the output is always the same binary length regardless of the size of the input. Thus, an input having a large binary length may be mapped to an output having a shorter binary length. Further, if only one bit in a message or file is changed, approximately 50% of the bits in the output change. There is no known relationship between the input and output of a hash algorithm which may be used to recover the input from the output. Thus, even "brute-force" trial-and-error attacks become prohibitive in time and cost, often requiring large "dictionaries" to be created which match all potential values with their corresponding hashes.

Encryption algorithms may, in addition, be classified as deterministic or non-deterministic. A deterministic encryption algorithm is one which returns the same result each time a specific input is applied to the encryption algorithm. Different inputs produce different outputs. A non-deterministic encryption algorithm is one in which the result is not necessarily the same, even with identical inputs. For example, a random number generator provides a non-deterministic result.

Secure data transmission systems have been developed using symmetric and asymmetric encryption, reversible and irreversible algorithms, and deterministic and non-deterministic encryption, but they are often very complex and involve cumbersome cryptographic procedures and management. Accordingly, current methods employed for the protection of data being stored or transmitted over a network could benefit from improved techniques and devices for safeguarding such information.

The security of financial data transmission is especially critical. Many states throughout the U.S. hold institutions that store payment card industry ("PCI") data (e.g., credit card numbers, magnetic strip information, CVV codes, track data, etc.) liable for the costs associated with blocking and reissuing payment cards in the event of a security breach. Parties that are negatively impacted by such unauthorized disclosures of PCI data can also bring suit against the companies maintaining the PCI data. Thus, there is a need to transmit payment information securely and/or process payments without storing the type of payment information that is subject to PCI compliance laws.

SUMMARY OF THE DISCLOSURE

In accordance with certain embodiments of the present disclosure, a method and system for protecting data being transmitted over a network is disclosed. The method includes irreversibly encrypting an account number, a client identification number, and a random number. In one embodiment, the irreversible encryption is accomplished using a hashing algorithm. The hashed data can then be concatenated with the same random number and further encrypted in order to create an account signature. A client seeking payment can then send the account signature, accompanied by a client identification number and some portion of the account number to a processing party who can determine if the account number contained in the account signature is valid. If the account number is valid, the payment can be processed and the client can be notified of the successful payment.

A further object is to provide a secure method of transmitting financial data that is highly resistant to brute-force attempts to decrypt an account number or any other financial data necessary to execute an unauthorized payment, even in the event that a third party intercepted the transmission.

According to another aspect, the present disclosure is directed to systems and methods for transmitting financial data without requiring a client seeking payment to store or otherwise manage payment method data that could be subject to PCI compliance laws.

In accordance with another aspect, systems and methods for wirelessly transmitting an account number are disclosed. The term "account number," as used herein, includes any confidential data string to be transmitted wirelessly or over a network. Non-limiting examples of an account number include a credit card account number, a checking account number, a bank routing number, or other payment information. Alternatively or additionally, an account number can be some other data string unrelated to financial information. For example, an account number can be an entry code embedded in an RFID chip, a keyless entry remote control, or a garage door opener. However, these examples are not meant to be limiting in nature, as an account number can take on numerous other forms and be used in various contexts.

Additional objects and advantages of the present disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments and together with the description, serve to explain the principles of the invention.

DESCRIPTION OF EXEMPLARY EMBODIMENTS

Disclosed herein are various methods and systems for securely storing and transmitting information. Generally, the methods include concatenating an account number, a client identification number, and random data, hashing that concatenated data, and creating an account signature by concatenating the hashed data with the same random data. In another aspect, the account signature can be sent from a client seeking payment to a payment processing party along with the client identification number and some portion of the account number. For example, in one exemplary embodiment, the account signature can be sent to the payment processing party along with the client identification number and the last four digits of the account number. The payment processing party can extract the account signature, the client identification number, and the last four digits of the account number and, using a database comprising account numbers, determine if the hashed account number is registered for use with the client.

Reference will now be made in detail to certain exemplary embodiments, examples of which are illustrated in the accompanying drawings. Wherever possible, the same reference numbers will be used throughout the drawings to refer to the same or like items.

Figure 1:
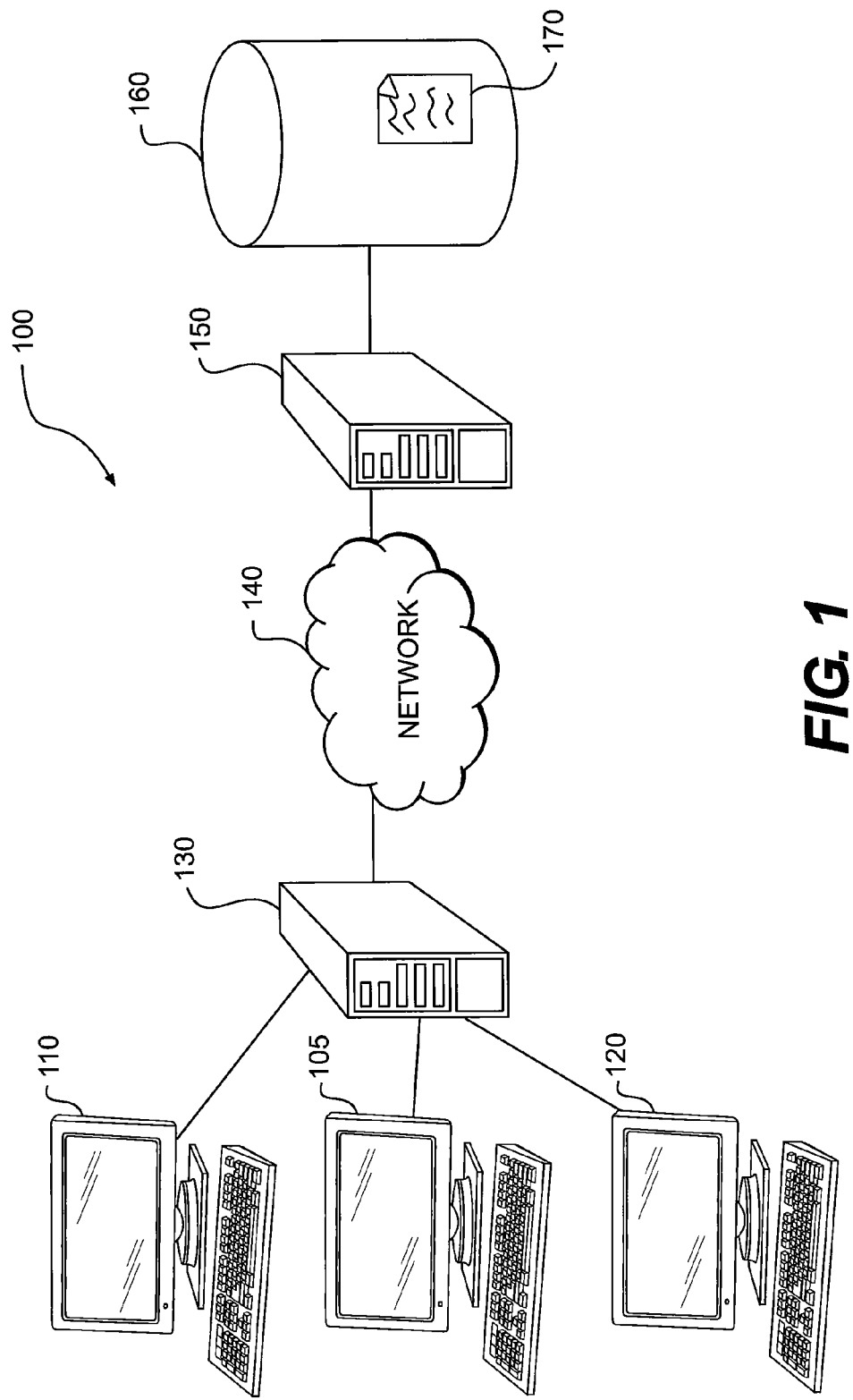
FIG. 1 is an illustration of an exemplary embodiment of a network or system as described herein.

FIG. 1 depicts an exemplary embodiment of a system 100 configured to securely transmit information. In one aspect, the system can comprise a client terminal 105. Client terminal 105 can be a computer or point-of-sale terminal comprising a processor, a memory, a monitor, and user input devices such as a mouse and/or a keyboard. Client terminal 105 can also comprise a payment information input device such as a device capable of reading a magnetic strip or embedded chip located on or in a credit card, debit card, or similar payment method. In another aspect, client terminal 105 can be in communication with client server 130. In one exemplary embodiment, several client terminals 105, 110, and 120 can be in communication with client server 130. In other embodiments, more or fewer client terminals can be in communication with client server 130. Alternatively, communication between the one or more client terminals and client server 130 can be accomplished in additional and/or different ways. For example, client terminals 105, 110, and 120 can be connected to client server 130 via a cable or other wired connection. In other embodiments, client terminals 105, 110, and 120 can be connected to client server 130 wirelessly.

Client terminals 105, 110, and 120, as well as client server 130, described above, are only a few examples of components that can comprise system 100. Further, it is contemplated that additional and/or different configurations of system 100 may be employed without departing from the scope of the present disclosure. The particular embodiments of system 100 that are depicted in the figures are not intended to be exhaustive and system 100 is not limited to these particular configurations.

In another aspect of the system shown in FIG. 1, client server 130 can be connected to a network 140, e.g. the Internet, and can be configured to communicate with payment processing server 150. Again, the particular configuration and examples shown and discussed herein is not intended to limit the various embodiments of system 100. Network 140 can be any communication link between the client and the payment processing party over which information can be transmitted.

Processing server 150 can comprise a processor and memory and also be configured to access a database 160. Database 160 can contain sensitive information, such as account information for a client's customers. In one exemplary embodiment, account information for a particular client's customers can be maintained at record 170 within database 160. Again, similar to the client network, the processing network comprising a processing server and database 160 can comprise additional, fewer, or alternate components capable of serving a similar purpose to those components described herein. The particular configurations described above are not intended to be exhaustive or to limit the scope of system 100 and any network configuration known in the art can be implemented.

Figure 2:
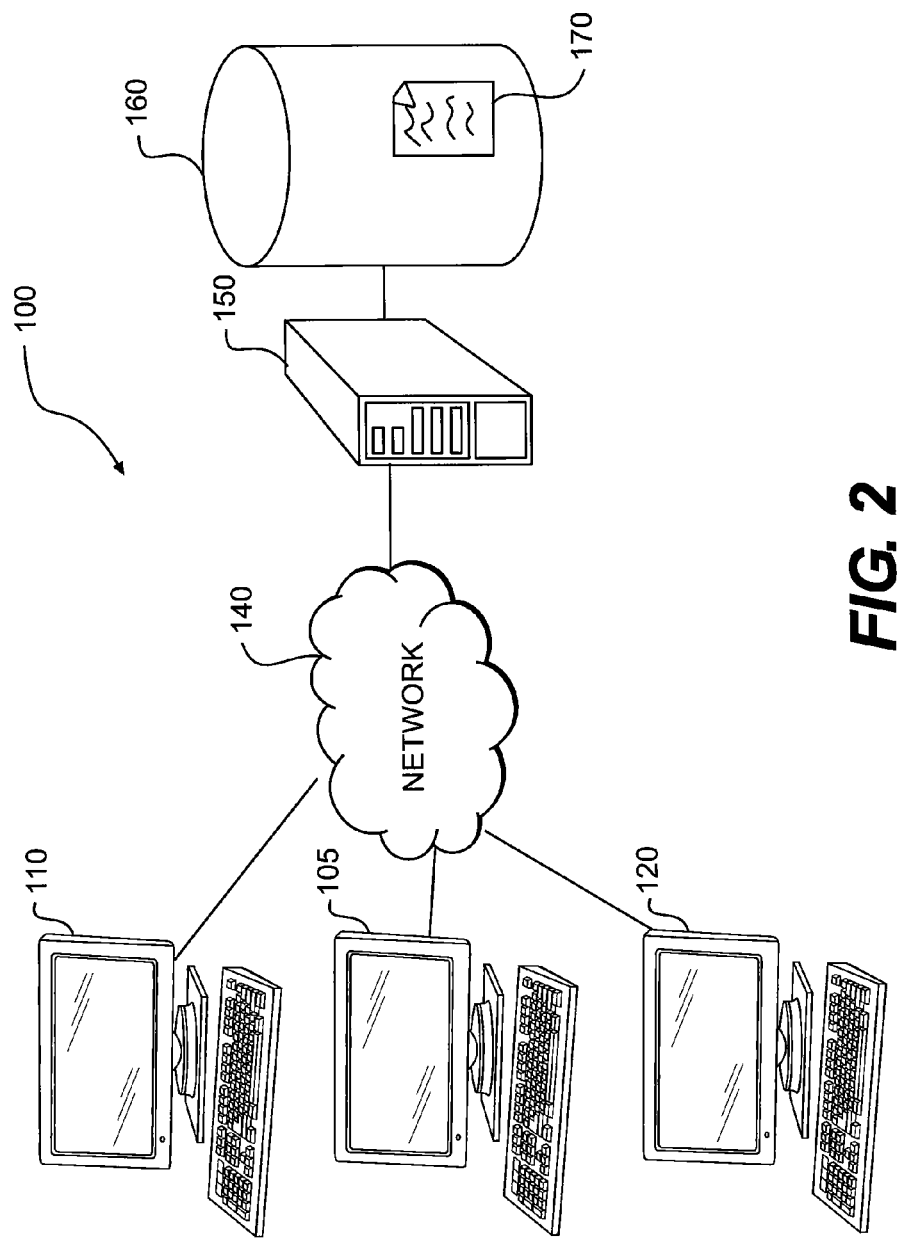
FIG. 2 is an illustration of another exemplary embodiment of a network or system as described herein.

FIG. 2 depicts another embodiment of system 100 configured to securely transmit information. System 100 shown in FIG. 2 differs from that shown in FIG. 1 in that user terminals 105, 110, and 120 (e.g., point-of-sale terminals) can be connected directly to processing server 150 via network 140 (e.g., the Internet). In this manner, information collected at the various user terminals need not pass through a client server before being sent to processing server 150.

Figure 3:
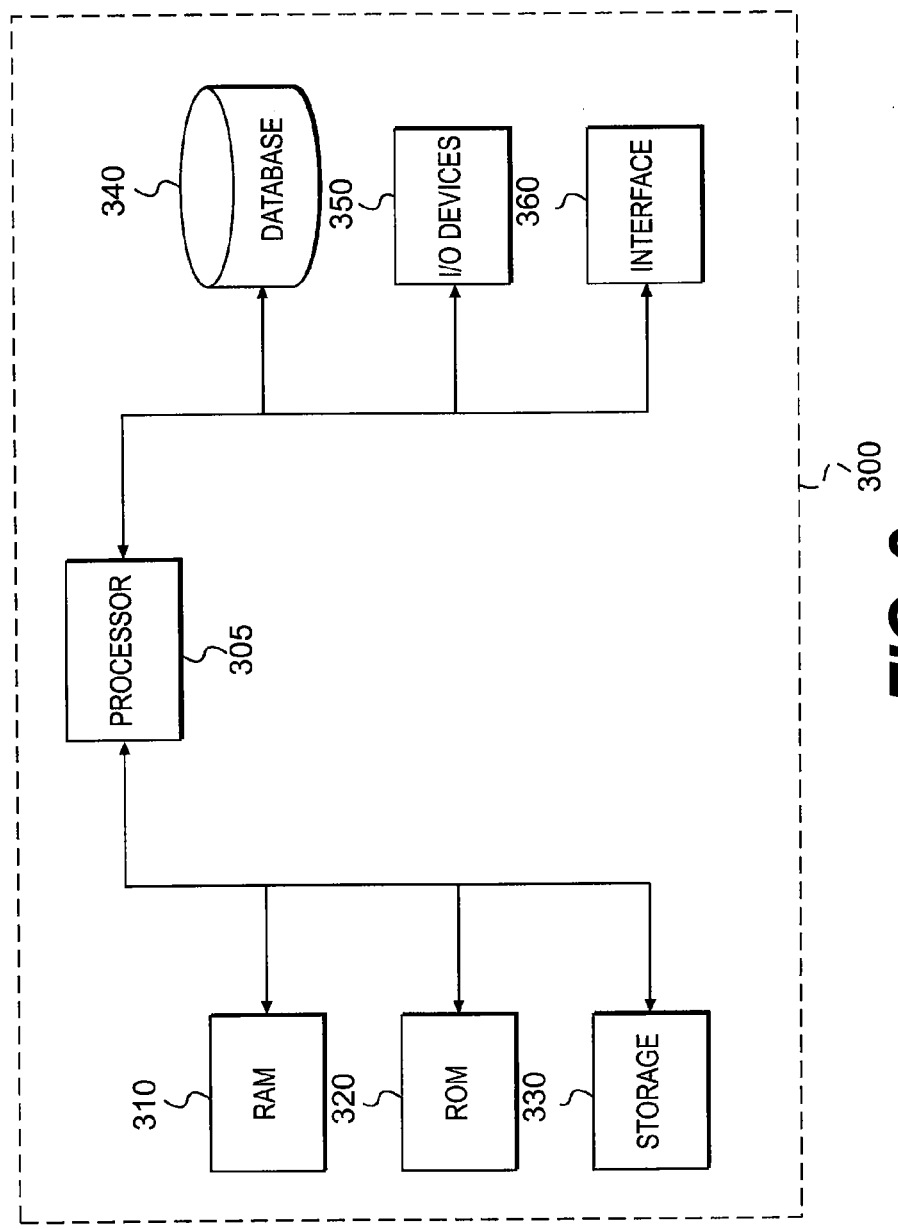
FIG. 3 is an illustration of an exemplary embodiment of a computer as described herein.

In another aspect, client terminals 105, 110, and 120, as well as servers 130 and 150 may include any type of processor-based system 300 on which processes and methods consistent with the disclosed embodiments may be implemented. As illustrated in FIG. 3, system 300 may include one or more hardware and/or software components configured to execute software programs, such as software for storing, processing, and analyzing data. For example, system 300 may include one or more hardware components such as, for example, processor 305, a random access memory (RAM) module 310, a read-only memory (ROM) module 320, a storage system 330, a database 340, one or more input/output (I/O) devices 350, and an interface 360. Alternatively and/or additionally, system 300 may include one or more software components such as, for example, a computer-readable medium including computer-executable instructions for performing methods consistent with certain disclosed embodiments. It is contemplated that one or more of the hardware components listed above may be implemented using software. For example, storage 330 may include a software partition associated with one or more other hardware components of system 300. System 300 may include additional, fewer, and/or different components than those listed above. It is understood that the components listed above are exemplary only and not intended to be limiting.

Processor 305 may include one or more processors, each configured to execute instructions and process data to perform one or more functions associated with system 300. As illustrated in FIG. 3, processor 305 may be communicatively coupled to RAM 310, ROM 320, storage 330, database 340, I/O devices 350, and interface 360. Processor 305 may be configured to execute sequences of computer program instructions to perform various processes, which will be described in detail below. The computer program instructions may be loaded into RAM for execution by processor 305.

RAM 310 and ROM 320 may each include one or more devices for storing information associated with an operation of system 300 and/or processor 305. For example, ROM 320 may include a memory device configured to access and store information associated with system 300, including information for identifying, initializing, and monitoring the operation of one or more components and subsystems of system 300. RAM 310 may include a memory device for storing data associated with one or more operations of processor 305. For example, ROM 320 may load instructions into RAM 310 for execution by processor 305.

Storage 330 may include any type of mass storage device configured to store information that processor 305 may need to perform processes consistent with the disclosed embodiments. For example, storage 330 may include one or more magnetic and/or optical disk devices, such as hard drives, CD-ROMs, DVD-ROMs, or any other type of mass media device.

Database 340 may include one or more software and/or hardware components that cooperate to store, organize, sort, filter, and/or arrange data used by system 300 and/or processor 305. For example, database 340 may include account information and/or payment historical data. Alternatively, database 340 may store additional and/or different information.

I/O devices 350 may include one or more components configured to communicate information with a user associated with system 300. For example, I/O devices 350 may include a console with an integrated keyboard and mouse to allow a user to input parameters associated with system 300. I/O devices 350 may also include a display including a graphical user interface (GUI) for outputting information on a monitor. I/O devices 350 may also include peripheral devices such as, for example, a printer for printing information associated with system 300, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 360 may include one or more components configured to transmit and receive data via a communication network, such as the Internet, a local area network, a workstation peer-to-peer network, a direct link network, a wireless network, or any other suitable communication platform. For example, interface 360 may include one or more modulators, demodulators, multiplexers, demultiplexers, network communication devices, wireless devices, antennas, modems, and any other type of device configured to enable data communication via a communication network.

Figure 4:
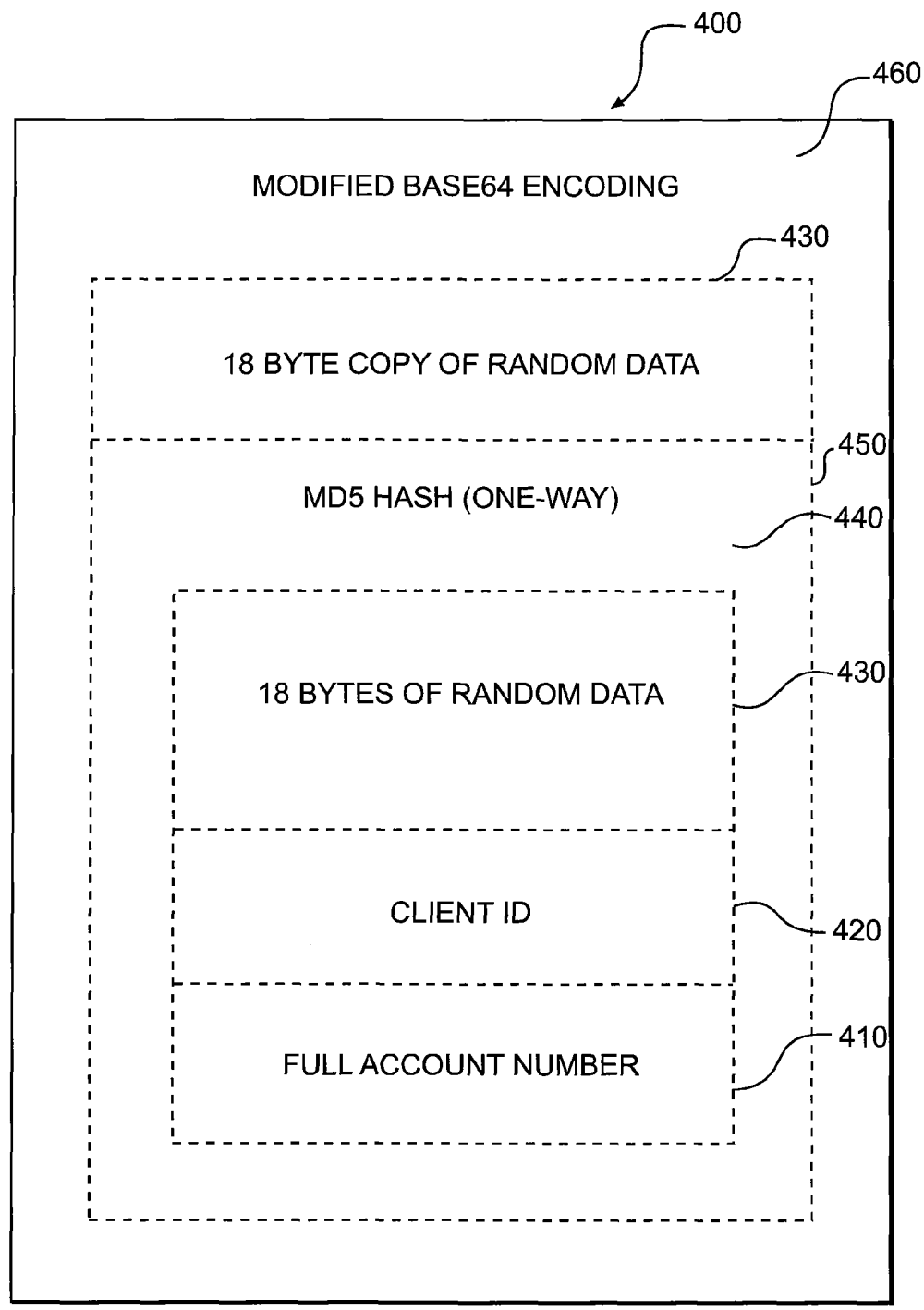
FIG. 4 is an illustration of an exemplary embodiment of an account signature as described herein.

FIG. 4 provides a diagram depicting one exemplary embodiment of an account signature 400. In one aspect, an account number 410, client identification number 420, and random data 430 can be concatenated and subjected to an irreversible, or one-way, hashing algorithm. In this manner, the account number, as well as the client identification number and random data, may no longer be recoverable from the standpoint of any unauthorized party, in the event of a breach.

In one exemplary embodiment, the random data can comprise 18 bytes of random data. In other embodiments, the random data can comprise either fewer than 18 bytes of data or more than 18 bytes of data. The irreversible hashing algorithm can be any one-way hashing algorithm. In one embodiment, the hashing algorithm can be a message-digest algorithm 5 (MD5). In another embodiment, the hashing algorithm can be a secure hash algorithm (SHA). In other embodiments, some other one-way hashing algorithm can be used.

In another aspect of the account signature depicted in FIG. 4, the hashed information 440 can then be concatenated with the same random data 430 used within the hash. In one embodiment, the random data is the same 18-byte string contained within the hash. In other embodiments, the random data is fewer or more than 18 bytes.

The entire output 450 can then be converted to an easier-to-read form 460 comprising only letters, numbers, and punctuation. For example, in one exemplary embodiment, the output 450 can be subjected to an industry-standard technique called Base64 encoding. In another embodiment, the output 450 can be subjected to modified Base64 encoding, or "modified Base64," which is also known as "Base64 encoding with URL and Filename Safe Alphabet" and is described in the Network Working Group's Request for Comments #3548. While modified Base64 is not an Internet standard, it is widely distributed throughout the Internet community. However, in other embodiments, the output 450 can be subjected to some other known type of encryption.

Figure 5:
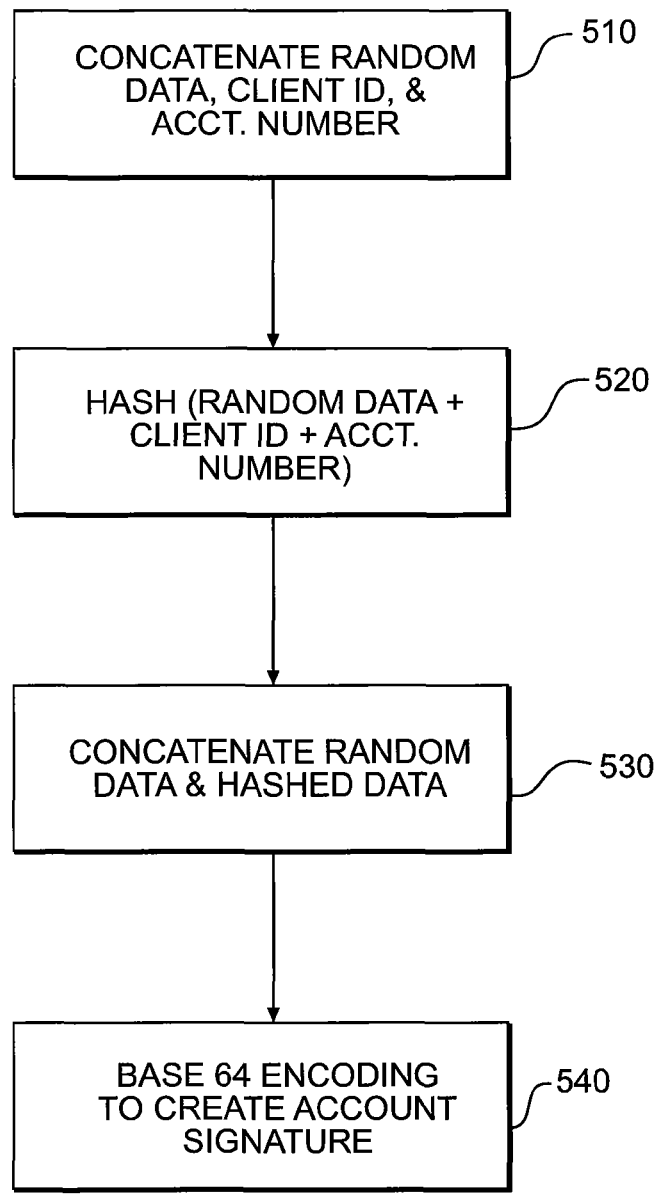
FIG. 5 is a flow chart depicting one exemplary sequence for constructing an account signature as described herein.

FIG. 5 depicts one exemplary method for constructing the account signature. In one aspect, in step 510 the account number 410, the client identification number 420, and the random data 430 can be concatenated. At step 520, the concatenated data can be subjected to an irreversible hashing algorithm. In one exemplary embodiment, the hashing algorithm can be an MD5 or SHA. In other embodiments, some other one-way hashing algorithm can be used. In additional embodiments, some combination of two or more hashing algorithms can be used in series. Alternatively, a hashing algorithm can be used in conjunction with some other form of encoding.

At step 530, the output of the hashing step 520 is concatenated with the same random data 430 used within the hash. In one exemplary embodiment, random data 430 can comprise 18 bytes (or 144 bits) of random data. In other embodiments, random data 430 can be fewer or greater than 18 bytes.

The data string can then be subjected to further encoding at step 540 to create the account signature. For example, in one exemplary embodiment, the full data string can be subjected to Base64 encoding. In another embodiment, modified Base64 encoding can be used. In other embodiments, some other type of encoding is implemented.

Figure 6:
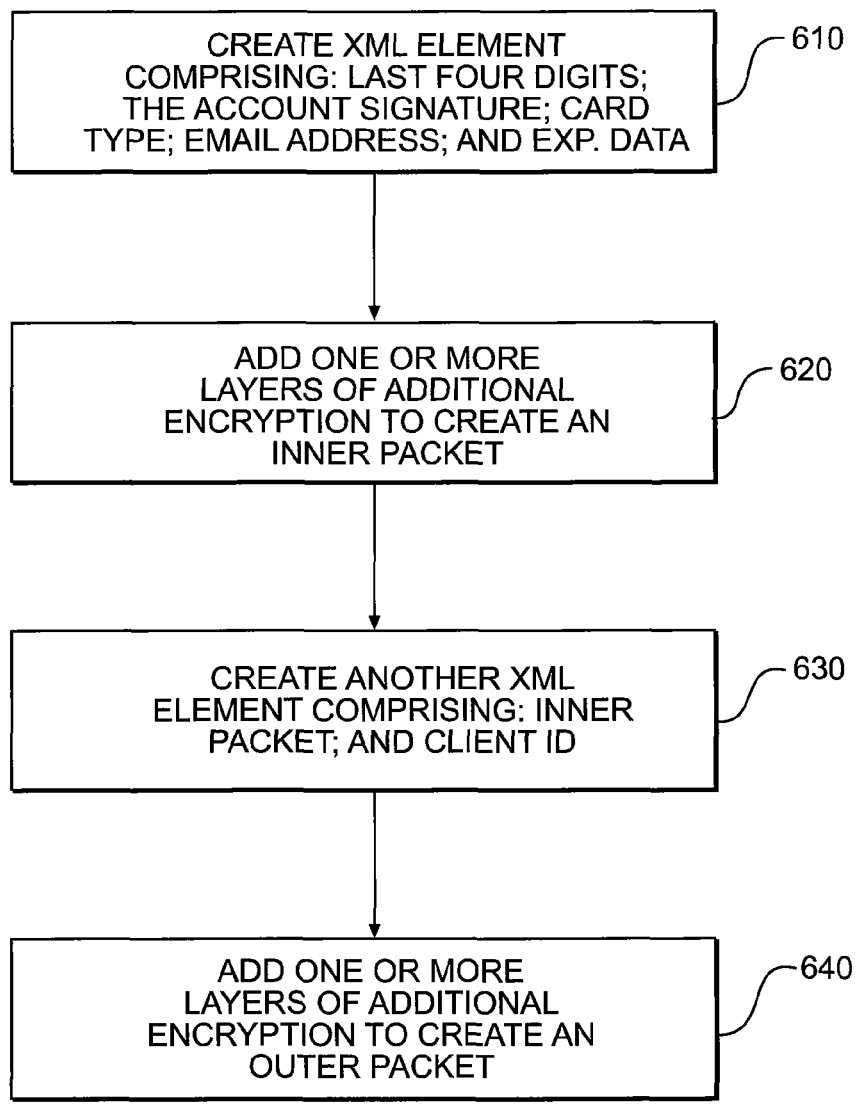
FIG. 6 is a flow chart depicting one exemplary sequence for constructing a transmission packet as described herein.

Additional steps that can be taken in preparation of transmitting account signature 400 are depicted in FIG. 6. In one exemplary embodiment, an XML element can be created at step 610 that can comprise the account signature 400, the last four digits 710 of the account number 410, an indication of the card type 720, an email address 730, and an expiration date and/or time 740. The types and quantities of information associated with the XML element described herein are exemplary only and not intended to be limiting. Indeed, it is contemplated that additional or less information may be included as part of the XML element, depending upon customer or subscriber specifications, without departing from the scope of the present disclosure. For example, any information that a client or payment processor might find helpful or useful can be included with the account signature. Additionally, the data can be packaged in some manner other than in an XML element.

Figure 7:
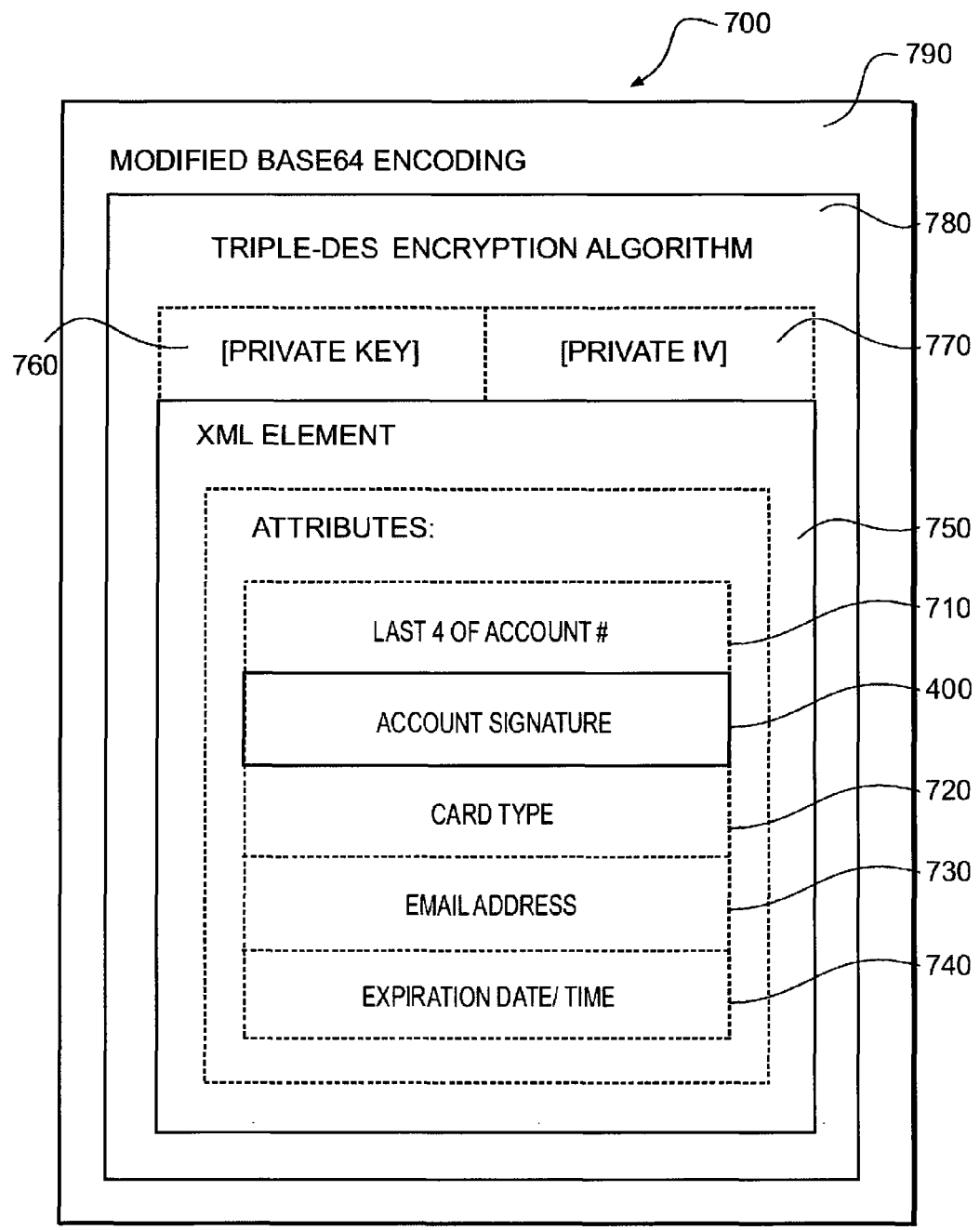
FIG. 7 is an illustration of an exemplary embodiment of an inner packet as described herein.

The XML element can then be further encoded at step 620 in order to create an inner packet 700 (depicted at FIG. 7). In one exemplary embodiment, Triple-DES encryption can be used to further encrypt the data. In such an embodiment, a public and a private key can be encoded with the XML element in order for authorized parties to access the XML element's content. Such a method of encryption is known in the art. In other embodiments, some other form of encoding can be used. For example, any other type symmetric encryption can be implemented to further encode the XML element. Alternatively, some form of asymmetric encryption can be utilized to create inner packet 700.

Further encryption of the inner packet can then be carried out in steps 630 and 640 in order to create an outer packet 800 (depicted at FIG. 8) that can be transmitted to a payment processing party. For example, in one exemplary embodiment, another XML element can be created at step 630 that can comprise inner packet 700 and the client identification number 420. In another embodiment, this XML element can comprise additional information. Furthermore, the client identification number is only an example of a piece of information that can be packaged with inner packet 700. In different embodiments, other types of information can be included with the inner packet. For example, any information that a client or payment processor might find helpful or useful can be included in the XML element along with the inner packet. Additionally, the data can be packaged in some manner other than in an XML element.

Figure 8:
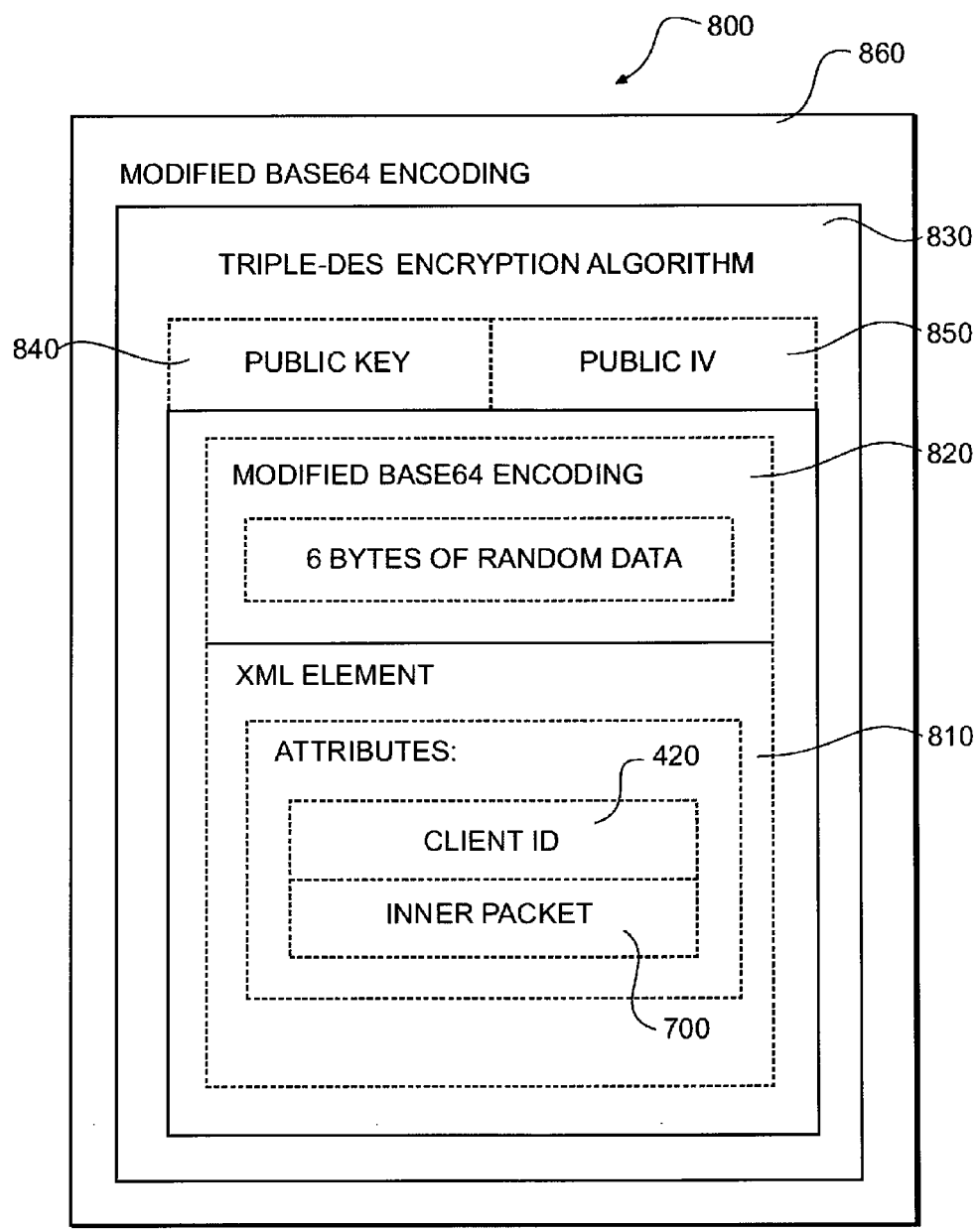
FIG. 8 is an illustration of an exemplary embodiment of an outer packet as described herein.

The XML element comprising the inner packet can then be further encoded at step 640 in order to create an outer packet 800 (depicted at FIG. 8). In one exemplary embodiment, Triple-DES encryption can be used to further encrypt the data. In such an embodiment, a public and a private key can be encoded with the XML element in order for authorized parties to access the XML element's content. In other embodiments, some other form of encoding can be used. For example, any other type symmetric encryption can be implemented to further encode the XML element. Alternatively, some form of asymmetric encryption can be utilized to create outer packet 800.

FIG. 7 depicts one exemplary embodiment of inner packet 700. As discussed above, XML element 750 comprises account signature 400, the last four digits 710 of the account number 410, an indication of the card type 720, an email address 730, and an expiration date and/or time 740. Again, however, the types and quantities of information associated with XML element 750 described herein are exemplary only and not intended to be limiting. Indeed, it is contemplated that additional or less information may be included as part of XML element 750, depending upon customer or subscriber specifications, without departing from the scope of the present disclosure. For example, any information that a client or payment processor might find helpful or useful can be included with the account signature. Additionally, the data can be packaged in some manner other than in an XML element.

The XML element can then be further encoded using a Triple-DES Encryption algorithm. In order to decrypt the Triple-DES Encryption algorithm and access the XML element's content, an authorized party must also have a private key 760 and a private initialization vector (IV) 770. Alternatively, the XML element can be accessible using a public key and public initialization vector. In other embodiments, some other form of encoding can be used. For example, any other type symmetric encryption can be implemented to further encode XML element 750. Alternatively, some form of asymmetric encryption can be utilized.

In addition to the Triple-DES Encryption layer 780, in one embodiment, inner packet 700 can be further encoded using Base64 encoding layer 790. In another embodiment, inner packet 700 can be further encoded using modified Base64 encoding. In still other embodiments, some other type of further encryption can be used to secure the inner packet from unauthorized access. Alternatively, no further encryption can be used.

FIG. 8 depicts an exemplary embodiment of outer packet 800. As discussed above with respect to FIG. 6, XML element 810 comprises inner packet 700 and client identification number 420. Again, the types and quantities of information associated with XML element 810 described herein are exemplary only and not intended to be limiting. Indeed, it is contemplated that additional or less information may be included as part of XML element 810, depending upon customer or subscriber specifications, without departing from the scope of the present disclosure. For example, any information that a client or payment processor might find helpful or useful can be included with inner packet 700. Additionally, the data can be packaged in some manner other than in an XML element.

In one embodiment, XML element 810 can then be further encoded using Base 64 encoding. In another embodiment, XML element 810 can be further encoded using modified Base64 encoding. In other embodiments, some other type of further encryption can be used to secure the XML element's content. Additionally, in one aspect, the encoded XML element 820 can be further encrypted using a Triple-DES Encryption algorithm. In order to decrypt the Triple-DES Encryption layer 830, an authorized user must have a public key 840 and a public initialization vector 850. Alternatively, the XML element 820 can be further encrypted using a Triple-DES Encryption algorithm in conjunction with a private key and a private initialization vector. In other embodiments, some other form of encoding can be used. For example, any other type symmetric encryption can be implemented to further encrypt encoded XML element 820. Alternatively, some form of asymmetric encryption can be utilized.

In another aspect, still more layers of encryption can be used to further encode outer packet 800. For example, in one embodiment, Triple-DES encrypted packet 830 can be further encoded using Base64 encoding layer 860. In another embodiment, Triple-DES encrypted packet 830 can be further encoded using modified Base64 encoding. In still other embodiments, some other type of further encryption can be used to secure the packet from unauthorized access. Alternatively, no further encryption can be used.

Figure 9:
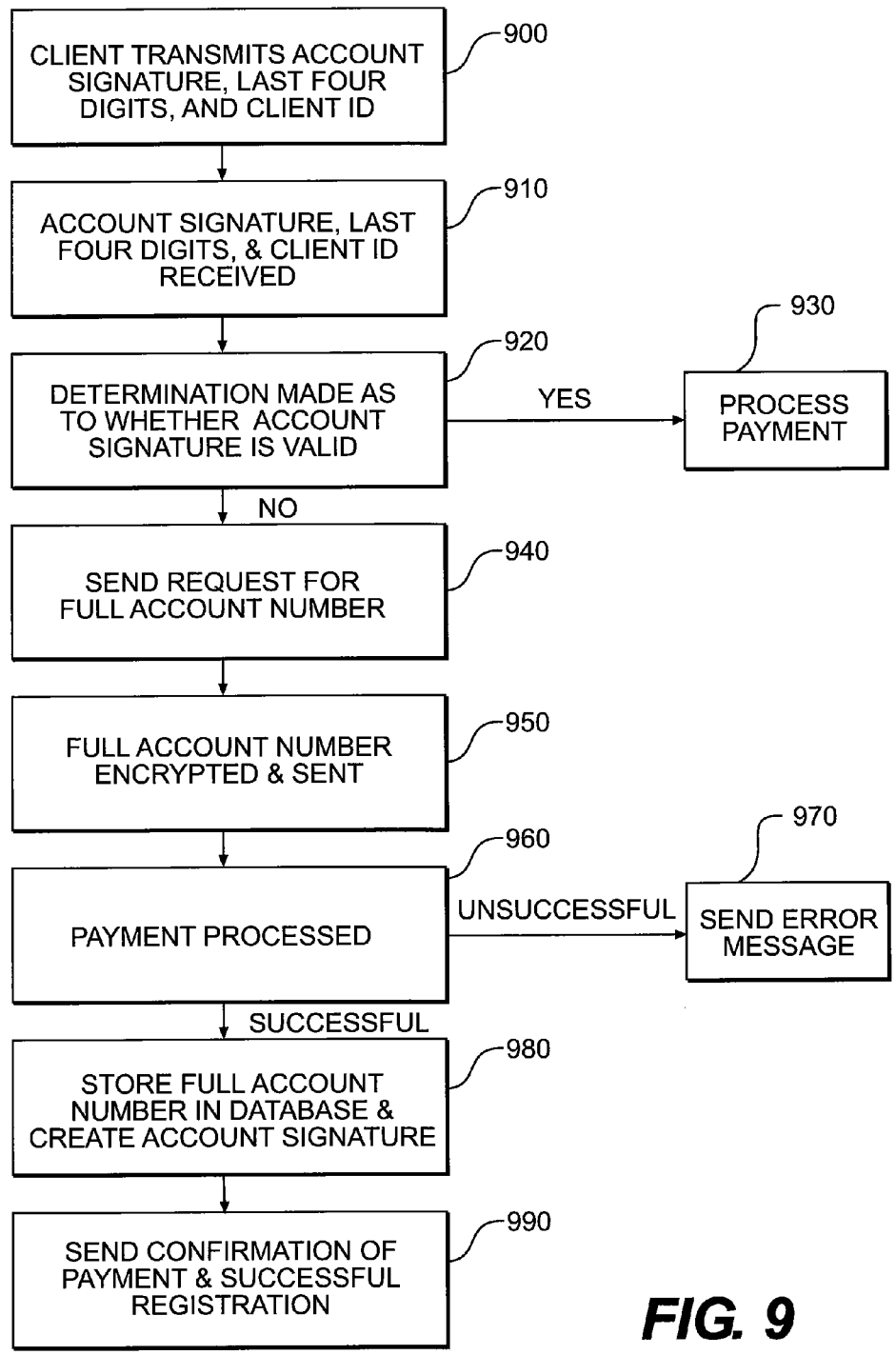
FIG. 9 is a flow chart depicting one exemplary sequence for securely registering to transmit data as described herein.

FIG. 9 depicts an exemplary registration method for registering a client to securely submit financial account information as described herein. At step 900, the client can send account signature 400, the last four digits 710 of account number 410, and client identification number 420, via network 140, to processing server 150. In other embodiments, the client can send additional or alternate information along with the account signature. For example, the client can send any other information that the client or payment processing party might find useful.

The payment processing party can received account signature 400, the last four digits 710, and the client identification number 420 at step 910 and, at step 920, can determine whether the account signature is valid. The method for determining whether the account signature is valid is discussed below with respect to FIG. 11. If it is determined that the account signature is valid, then at step 930 the payment processing party processes the payment and no further registration is required.

However, if it is determined that the account signature is not valid, then further steps must be taken to register the account information before a payment can be processed. For example, in one embodiment, when a determination is made that the account signature is not valid, a request is made by the payment processing party at step 940 and sent to the client asking for the full payment account number 410. In response, at step 950, the client sends the full payment account number 410 to the payment processing party. In one aspect, the account number 410 is encrypted prior to its transmission to the processing party. This encryption can be performed according to any one of various methods or algorithms. Furthermore, the encryption can be symmetric, asymmetric, deterministic, or non-deterministic.

Upon receipt of the full payment account number, the payment processing party can attempt to process the payment. In one aspect, if the attempt to process the payment is unsuccessful, at step 970 an error message can be generated and sent to the client, informing the client that either the account number previously sent is invalid or the account information provided was not accurate.

If the attempt to process the payment is successful, then, at step 980, the account number 410 can be stored in database 160 and an account signature can be generated according to one of the methods described above. In other embodiments, additional information, such as the client identification number 420, can be stored in database 160 and associated with the account number 410. In another embodiment, client identification number is stored in a separate database from database 160.

In another aspect of the registration method depicted in FIG. 9, at step 990, the processing party can send a confirmation message to the client, informing the client of the successful payment and notifying the client that the customer's payment information has been successfully registered. In one embodiment, rather than the processing party generating account signature 400, as described with respect to step 980 above, the client can generate the account signature based on the confirmation message received from the processing party.

Figure 10:
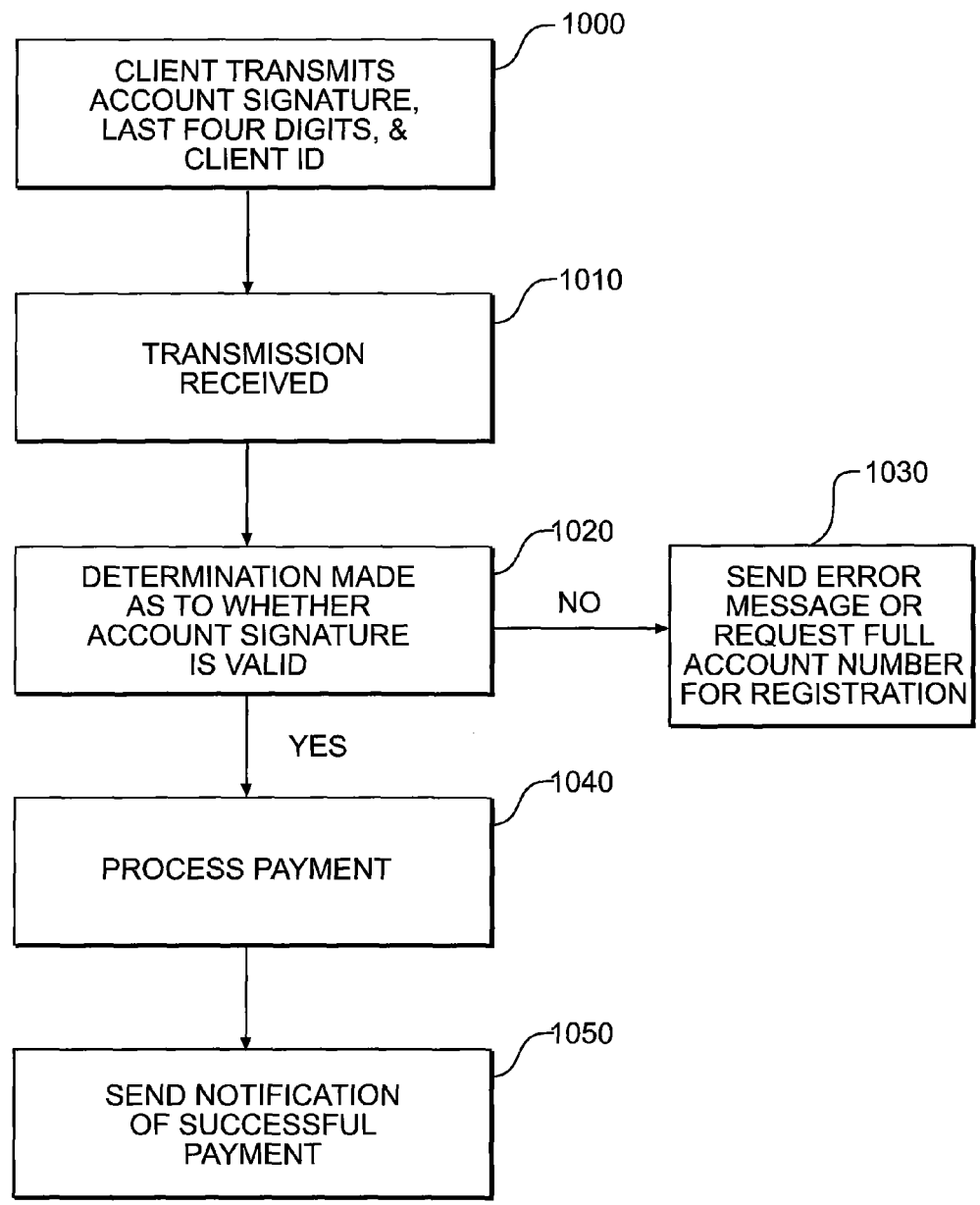
FIG. 10 is a flow chart depicting one exemplary sequence for securely transmitting data as described herein.

FIG. 10 depicts one exemplary method for securely transmitting payment information where a client and account information have been previously registered. At step 1000, the client can send account signature 400, the last four digits 710 of account number 410, and client identification number 420, via network 140, to processing server 150. In other embodiments, the client can send additional or alternate information along with the account signature. For example, the client can send any other information that the client or payment processing party might find useful.

The payment processing party can received account signature 400, the last four digits 710, and the client identification number 420 at step 1010 and, at step 1020, can determine whether the account signature is valid. The method for determining whether the account signature is valid is discussed below with respect to FIG. 11.

If it is determined that the account signature is not valid, then, at step 1030, either an error message can be generated and sent to the client or a message requesting the full account number and account registration can be generated and sent to the client, as discussed with respect to FIG. 9. In one embodiment, an error message can be generated if the account signature 400, the last four digits 710, or the client identification number 420 is found to have an incorrect number of digits or characters. In another embodiment, an error message can be generated if the account signature is determined to be invalid and the client identification number received is not associated with the IP address associated with the corresponding client. In other embodiments, additional criteria can be used to determine if the invalidity of the account signature is a result of incorrect information provided by the client or an unregistered account number. In one aspect, where user error is suspected, the payment processing party can generate and send to the client a message indicating that payment processing was unsuccessful and that the account signature and accompanying information should be re-sent.

If, on the other hand, the account signature is valid, then, at step 1040, the payment processing party can process the payment. In one embodiment, at step 1050, after the payment has been successfully processed, a notification of successful payment can be generated and sent to the client.

Figure 11:
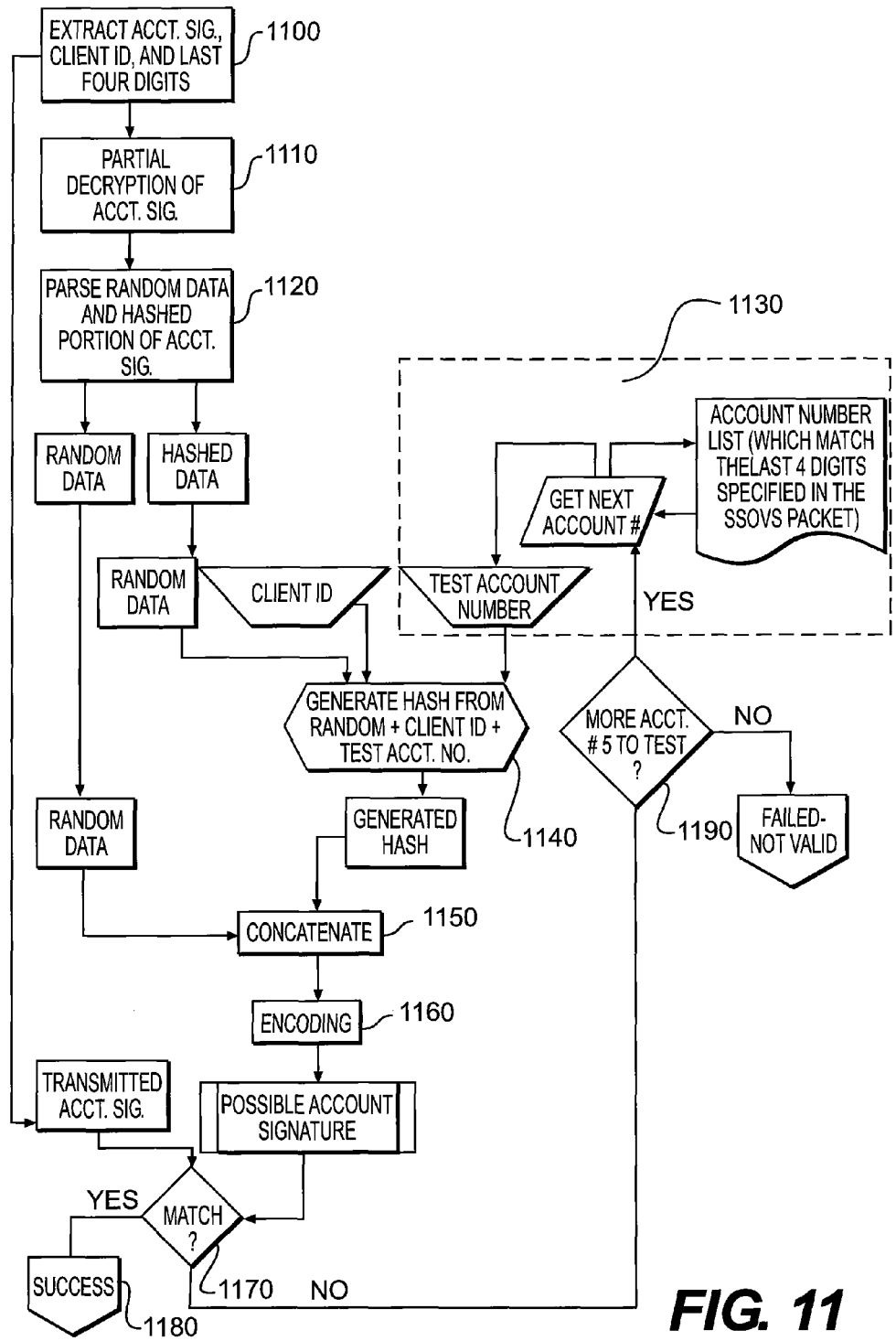
FIG. 11 is a flow chart depicting one exemplary sequence for determining a transmitted account number as described herein.

FIG. 11 depicts an exemplary method for determining whether the account signature received from the client is valid and/or registered. As discussed above, in one embodiment the client can send the payment processing party a transmission packet comprising the account signature 400, the last four digits 710 of the account number 410, and the client identification number 420. In some embodiments, this information is further encrypted in an inner packet 700 and an outer packet 800. In other embodiments, the account signature, last four digits of the account number, and the client identification number are transmitted using some other encryption method.

At step 1100, any necessary decryption is performed that may be necessary to extract the account signature 400, the client identification number 420, and the last four digits 710 of the account number 410. In one embodiment, this step involves decrypting the outer and inner packets described above with respect to FIGS. 7 and 8. In other embodiments, this step can involve extracting information other than the client identification number 420 or the last four digits 710. For example, any other information sent with the account signature 400 can be extracted from the transmission.

In another aspect, at step 1110, account signature 400 (depicted at FIG. 4) can be further decrypted to extract random data 430. In one embodiment, account signature 400 can be decrypted in order to extract an 18-byte random number or string of characters. In other embodiments, random data 430 can be a string comprising some other number of bytes.

In one aspect, at step 1120, the extracted random data 430 is parsed from the remainder of account signature 400, i.e., the hashed portion 440. Next, at step 1130, processing server 150, in communication with database 160, retrieves a possible valid account number based on the client identification number 420 and the last four digits 710 of the account number 410. For example, in one exemplary embodiment, processing server 150 retrieves a first account number from database 160, where the first account number shares the same last four digits as the last four digits 710 of account number 410 transmitted from the client and the account number is registered to the same client identification number transmitted from the client. In other embodiments, additional or different information can be used to select the first account number from database 160.

Next, at steps 1140-1160, a verification packet is created by the processing party using the first account number and it is determined whether the verification packet matches the transmission packet (data received from the client). For example, in one embodiment, the first account number, the client identification number 420, and the random data 430 can be hashed according to the same algorithm used by the client to create the account signature, as transmitted. This hashed information can then be concatenated with random data 430 at step 1150, further encoded at step 1160, again in accordance with whatever encoding took place when the client constructed the account signature, and, at step 1170, this newly generated data can be compared with the account signature as originally received from the client. In one embodiment, if a match is found between the processing party-generated data and the account signature received from the client, then it can be determined that the first account number retrieved from database 160 is the correct account number and, at step 1180, the processing party can successfully process the payment. On the other hand, if the processing party-generated data and the account signature received from the client do not match, then it can be determined that the first account number retrieved from database 160 is not the correct account number. In this instance, processing server 150, at step 1190, determines if there are additional account numbers in database 160 that comprise the same last four digits as the last four digits 710 received from the client and that is associated with the client identification number 420. If there are more account numbers in database 160 that meet these criteria, then processing server 150 can retrieve another account number from database 160 comprising the same last four digits as the last four digits 710 of account number 410 and corresponding to client identification number 420.

The process of reconstructing an account signature and determining whether it matches the account signature received from the client (steps 1140-1170) then repeats itself. In one aspect, this process of retrieving a possible matching account number from database 160, constructing an account signature, and determining whether it matches the account signature received from the client repeats until a match between the constructed account signature and the account signature received from the client is recognized. In another aspect, once a match is found, the correct account number in database 150 can be identified and the payment can be processed. Alternatively, if, at step 1190, it is determined that no more account numbers in database 160 comprise the same last four digits as the last four digits 710 of account number 410 that are also associated with client identification number 420, i.e., every potentially viable account number in database 160 is used to construct an account signature and none of those account signatures matches the account signature received from the client, then either an error message can be created and sent to the client or a message indicating the initiation of the registration process described with respect to FIG. 9 can be sent to the client.

It should be appreciated that, in this manner, a client can send payment and account information over a network to a payment processing party with very little risk of that information being intercepted and used for unauthorized transactions. For example, since the full account number is only sent as part of an irreversible hash, even if a party intercepted the transmission between the client and the processing party and managed to fully decrypt all the information except the irreversibly hashed information, that data (the client identification number, the last four digits of the account number, and the random data) could not be used to conduct a financial transaction that would benefit the attacker. Thus, Applicant's method provides a secure method of transmitting payment information, even assuming an unauthorized party can intercept the transmission.

Additionally, using the methods and systems described above, a client does not need to store a customer's account number, e.g., credit card account numbers, checking account numbers, bank routing numbers, etc., in its own database in order to process payments. Rather, all account numbers are maintained by the processing party and the account numbers are never transmitted between the parties outside of an irreversible hash. Thus, clients avoid having to comply with any applicable PCI compliance laws.

It should further be appreciated that additional features can also be incorporated into the methods and systems described above to improve their functionality. For example, additional layers of encryption can be incorporated into the various stages of data encoding and transmission. Alternatively, different system and/or network configurations can be utilized. In other embodiments, the client identification number discussed above can be incremented every time the account number is transmitted. In such an embodiment, both the sender and receiver of the account number can increment the client identification number after every transmission. As a result, even if an unauthorized party were to obtain the random number, the account number, and any other necessary information, the client identification number transmitted by the unauthorized party would not correspond to the incremented client identification number maintained by the receiving party and the transaction can be denied. Additionally, if the receiving party increments the client identification number following the failed attempt to process a transaction, the authorized sending party's client identification number would no longer match the client identification number maintained by the receiving party. Thus, the authorized sending party can be alerted to the security breach and be made aware of the attempted unauthorized transaction.

Moreover, while the above description describes a merchant initiating the transmission of payment method information, similar methods and systems can be implemented for consumer-initiated transactions. For example, in one embodiment, account information can be sent wirelessly from a point of sale terminal (e.g., self-checkout lane, restaurant table, online transactions, etc.) where the consumer inputs or "swipes" their credit card or other account information, rather than a merchant.

Figure 12:
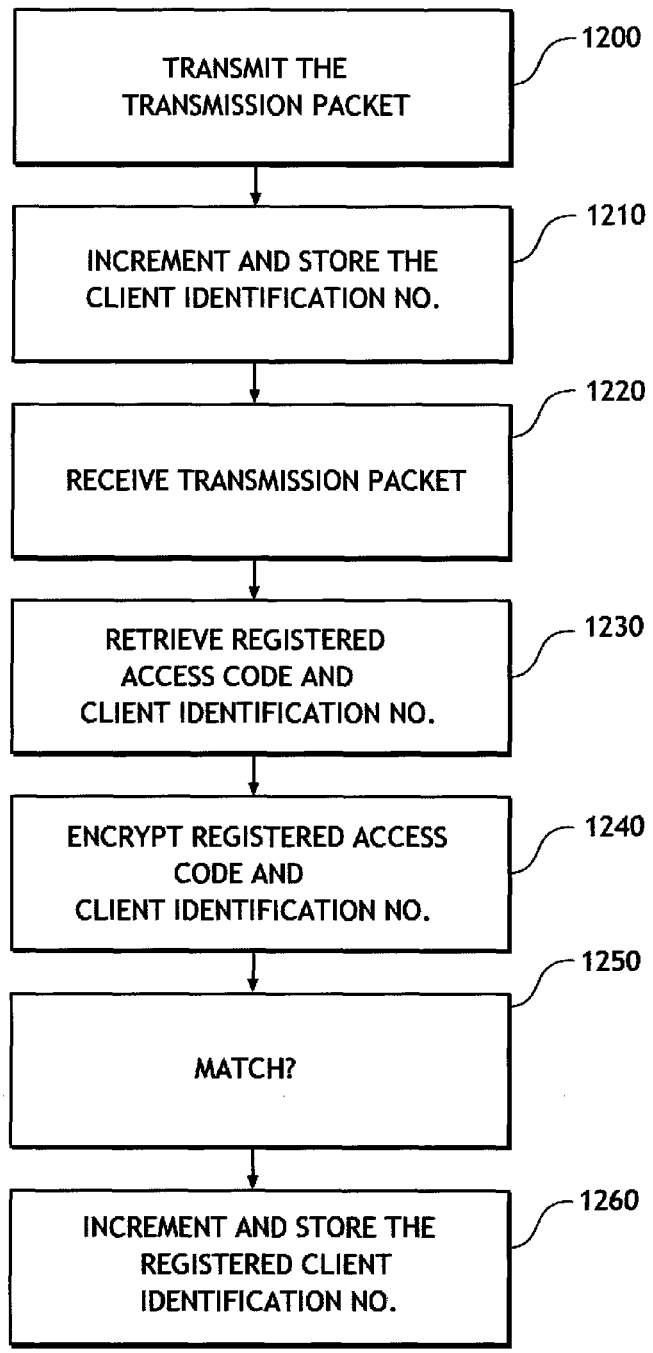
FIG. 12 is a flow chart depicting one exemplary sequence for determining a transmitted access code as described herein.

Furthermore, while the aforementioned embodiments discussed above relate to transmitting payment information, the encryption method and system described herein has many other applications. In one embodiment, depicted in FIG. 12, the encryption method or system described above can be utilized in the context of keyless (and/or wireless) entry devices. In one aspect, a user's remote control (or key card or other access device) can store a user access code (e.g., account number) and a client identification number. In another aspect, at step 1200, the user can press a button or otherwise cause the remote control to transmit a transmission packet to an entry device (e.g., a vehicle, garage door, building, door, etc.). In one embodiment, the remote control can encrypt the access code prior to transmission in the same way described above with respect to payment method information or an account number. In other embodiments, the remote control can encrypt both the access code and the client identification number prior to transmission. Again, this encryption can be accomplished using any of the encryption methods disclosed above. Additionally, other encryption methods can be used to encrypt the access code and/or client identification number.

Next, at step 1210, following transmission of the transmission packet, the remote control can increment the client identification number and can store the incremented client identification number within the remote control.

At step 1220, the transmission packet can be received by the entry device. At step 1230, the entry device can retrieve a registered access code from a database or storage device in much the same manner as described above with respect to a registered account number. The entry device can also retrieve a registered client identification number. In one aspect, at step

1240, the entry device can then encrypt the registered access code and the registered client identification number in the same manner that the remote control encrypted the access code and client identification number to create a verification packet.

At step 1250, the entry device can then compare the verification packet to the transmission packet to determine if they match. In one aspect, if a match is found between the verification packet and the transmission packet, entry can be granted. In another aspect, if the verification packet and the transmission packet do not match, access can be denied. Further, at step 1260, the entry device can increment and store the registered client identification number such that it remains the same as the incremented client identification number stored at the remote control.

In this manner, one can utilize keyless entry systems without ever wirelessly transmitting the access code in an unencrypted fashion. Moreover, if the irreversible encryption discussed above with respect to account numbers is utilized to encrypt the access code, the access code can be transmitted in such a way that even if an unauthorized party became privy to the transmission, it would be difficult to extract the access code and client identification number from the transmission, such that they could be used for a later communication with the entry device. Further, incrementing the client identification number and the registered client identification number at the remote and entry device, respectively, each time access is requested and granted ensures that an old transmission, potentially captured by an unauthorized party, cannot be used to successfully communicate with the entry device.

Additionally, other embodiments will be apparent from consideration of the specification and practice of the present disclosure. It is intended that the specification and examples be considered as exemplary only, with a true scope and spirit of the invention being indicated by the following claims.

What is claimed is:

1. A payment verification system comprising:
   a processor;
   memory storing executable instructions that when executed by a processor cause the processor to perform the steps of:
   receiving a reversibly encrypted transmission packet comprising a random data string, a client identification number, a portion of an account number and an irreversibly encrypted inner packet,
   the irreversibly encrypted inner packet comprising an irreversibly encrypted form of a copy of the random data string, the account number, and a copy of the client identification number;
   decrypting the reversibly encrypted transmission packet and extracting the random data string, the client identification number, the portion of the account number, and the irreversibly encrypted inner packet;
   selecting a registered account number from a database based on the client identification number and the portion of the account number;
   irreversibly encrypting the random data string, the client identification number, and the registered account number in order to create a verification packet; and
   determining if the verification packet matches the received inner packet; and
   based on a determination that the verification packet matches the received inner packet, processing a payment using the registered account number.

2. The system of claim 1, wherein the instructions further cause the processor to perform the steps of:
   if the verification packet does not match the inner packet:
   selecting a second registered account number from the database;
   irreversibly encrypting the random data string, the client identification number, and the second registered account number in order to create a second verification packet; and
   determinimg if the second verification packet matches the inner packet.

3. The system of claim 1, wherein the instructions further cause the processor to perform the steps of:
   determining that the verification packet does not match the received inner packet;
   determining that there are no other registered account numbers in the database that contain the portion of the account number; and
   sending an error message.

4. The system of claim 1, wherein the instructions further cause the processor to perform the steps of:
   incrementing the client identification number; and
   storing the client identification number in the database.

5. The system of claim 1, wherein the irreversibly encrypted inner packet is a hash of the copy of the random data string, the account number, and the copy of the client identification number.

6. A non-transitory computer-readable medium comprising instructions, wherein the instructions, when executed by at least one processor, cause the at least one processor to perform operations comprising:
   receiving a reversibly encrypted transmission packet comprising a random data string, a client identification number, a portion of an account number and an irreversibly encrypted inner packet,
   the irreversibly encrypted inner packet comprising an irreversibly encrypted form of a copy of the random data string, the account number, and a copy of the client identification number;
   decrypting the reversibly encrypted transmission packet and extracting the random data string, the client identification number, the portion of the account number, and the irreversibly encrypted inner packet;
   selecting a registered account number from a database based on the client identification number and the portion of the account number;
   irreversibly encrypting the random data string, the client identification number, and the registered account number in order to create a verification packet; and
   determining if the verification packet matches the received inner packet; and
   based on a determination that the verification packet matches the received inner packet, processing a payment using the registered account number.

7. The medium of claim 6, wherein the instructions further cause the at least one processor to perform operations comprising:
   if the verification packet does not match the inner packet:
   selecting a second registered account number from the database;
   irreversibly encrypting the random data string, the client identification number, and the second registered account number in order to create a second verification packet; and
   determining if the second verification packet matches the inner packet.

8. The medium of claim 6, wherein the instructions further cause the at least one processor to perform operations comprising:

determining that the verification packet does not match the received inner packet;
determining that there are no other registered account numbers in the database that contain the portion of the account number; and
sending an error message.

9. The medium of claim 6, wherein the instructions further cause the at least one processor to perform operations comprising:
incrementing the client identification number; and
storing the client identification number in the database.

10. The medium of claim 6, wherein the irreversibly encrypted inner packet is a hash of the copy of the random data string, the account number, and the copy of the client identification number.

11. A method for payment verification, comprising:
receiving, by at least one processor, a reversibly encrypted transmission packet comprising a random data string, a client identification number, a portion of an account number and an irreversibly encrypted inner packet,
the irreversibly encrypted inner packet comprising an irreversibly encrypted form of a copy of the random data string, the account number, and a copy of the client identification number;
decrypting, by the at least one processor, the reversibly encrypted transmission packet and extracting the random data string, the client identification number, the portion of the account number, and the irreversibly encrypted inner packet;
selecting, by the at least one processor, a registered account number from a database based on the client identification number and the portion of the account number;
irreversibly encrypting, by the at least one processor, the random data string, the client identification number, and the registered account number in order to create a verification packet; and
determining, by the at least one processor, that the verification packet matches the received inner packet; and
based on the determination processing, by the at least one processor, a payment using the registered account number.

12. The method of claim 11, further comprising:
if the verification packet does not match the inner packet:
selecting a second registered account number from the database;
irreversibly encrypt the random data string, the client identification number, and the second registered account number in order to create a second verification packet; and
determine if the second verification packet matches the inner packet.

13. The method of claim 11, further comprising:
determining that the verification packet does not match the received inner packet;
determine that there are no other registered account numbers in the database that contain the portion of the account number; and
send an error message.

14. The method of claim 11, further comprising:
incrementing the client identification number; and
storing the client identification number in the database.

15. The method of claim 11, wherein the irreversibly encrypted inner packet is a hash of the copy of the random data string, the account number, and the copy of the client identification number.

\* \* \* \* \*